Jan. 6, 1925.
A. R. THOMSON
1,522,396
ANTISKIDDING DEVICE
Filed Jan. 25, 1924
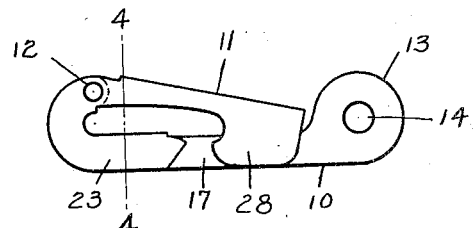
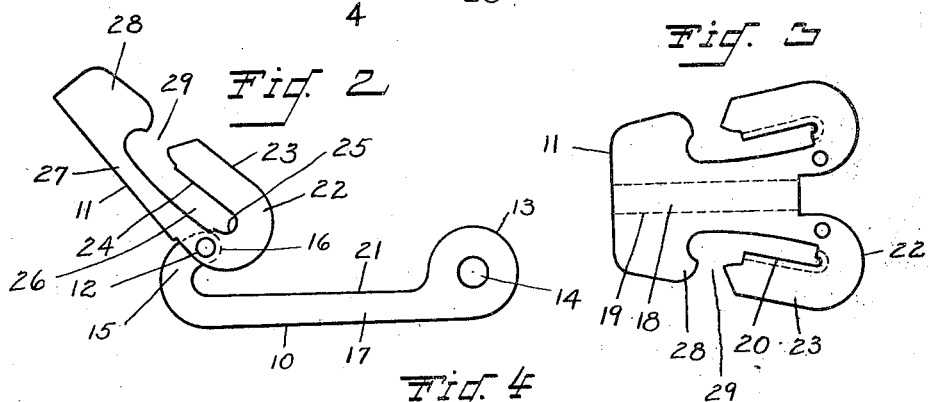
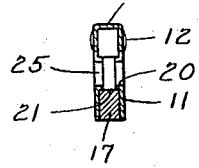
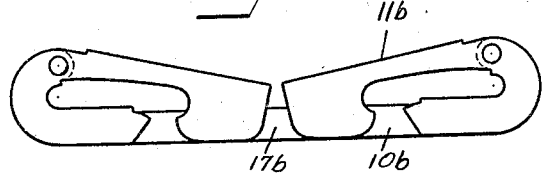
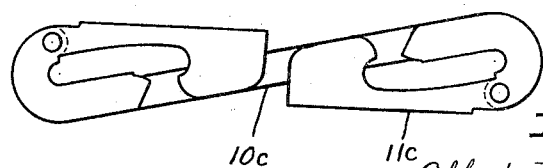
Inventor:
Albert R. Thomson
By Louis M. Schmidt
Atty.

Patented Jan. 6, 1925.

1,522,396

UNITED STATES PATENT OFFICE.

ALBERT R. THOMSON, OF DERBY, CONNECTICUT.

ANTISKIDDING DEVICE.

Application filed January 25, 1924. Serial No. 688,355.

*To all whom it may concern:*

Be it known that I, ALBERT R. THOMSON, a citizen of the United States, residing at Derby, in the county of New Haven and State of Connecticut, have invented certain new and useful Improvements in Antiskidding Devices, of which the following is a specification.

My invention relates to improvements in anti-skidding devices for use with automobile wheel and tire structures and has particular reference to a clip or hook structure that is adapted for use in connecting together parts of the side chain structures that are cross-connected by the tread members, and the object of my improvement is to produce a clip or hook that has its parts constructed and arranged so as to facilitate the engagement with the loops or eyes of said side chains, that is virtually self-locking under conditions of use, and that has the moving part made of sheet metal and arranged so as to serve as a lining and protecting layer for the active portion of the fixed part.

In the accompanying drawing:—

Figure 1 is a side elevation of a hook for use with anti-skidding devices that is made in accordance with my invention, the parts being in the closed position.

Figure 2 is a similar view of the same with the parts in the open position.

Figure 3 is a view of the blank for the moving part.

Figure 4 is a sectional view on the line 4—4 of Fig. 1.

Figure 5 is a side elevation of a modified structure of duplex form, with the fixed part of U-shape.

Figure 6 is a side elevation of another modified form that differs from that shown in Fig. 5 in having the fixed part generally in the form of the letter S.

My improved clip or hook for use with anti-skidding devices comprises a body portion 10, that serves as the fixed part, and a moving part 11, said parts being operatively connected together by means of a pivotal pin 12.

The fixed part 10 is made of relatively heavy metal and has at one end an eye structure 13 that has an opening 14 that is suitable for receiving and being connected with some part of the side chain structure, and may be fixedly connected with one of the free ends of an opening, the hook to be described being adapted to make separable connection with the other of said free ends.

At the other end of said fixed part 10 is a laterally directed hook-like arm 15 that has in the free end portion 16 an opening for the pivotal pin 12.

Intermediate said eye structure 13 and arm 15 is a connecting shank 17 that is substantially straight.

The moving part 11 is a shell-like structure that is made of sheet metal and comprises a longitudinally directed middle portion or backbone 18 and a pair of wing structures connected along the side edges 19, the entire structure being of symmetrical form relatively to said backbone 18.

The backbone 18 is substantially the same width as the thickness of the material of the fixed part 10 and the wings are in pendant relation thereto so as to be adapted generally to lay along the opposed side faces of the body or fixed part 10. The major portions of said wings lay alongside the faces mentioned and are formed to cover the same and in addition to said major portions there are provided diminutive flange structures 20 that combine to cover the opposed inner edge portion 21 of the fixed part 10 and provide a bearing for the chain link or other device that is connected to the hook under conditions of use.

The particular portion of the wing structure in each case that is opposed directly to the fixed part 10 comprises a hook-like portion 22 at the end that is connected to the fixed part by means of the pivotal pin 12 and has an arm 23 of appreciable length and in the closed position extends along the side face of the shank 17. The protecting and bearing flange 20 is connected along the inner edge 24 of the arm 23 and also extends laterally along the curved border 25 of the recess or hook-opening 26.

The hook-like portion 22, as described, serves as the locking means in engagement with the part that is connected with the hook structure and also serves as a lining for the opposed and adjacent portions of the fixed part 10.

On the other side of the pivotal pin 12 from the hook-like portion 22 the wing structure comprises in each case a longitudinally directed flange-like shank 27 that supports at the free end a second hook structure 28 that is separated from the hook-like portion 22 by a gap 29 for admitting the part to be connected with the clip or hook.

The hook structure 28 when in the open position serves to facilitate making connection with a chain link and the like, being readily engaged therewith, and as the clip is brought to the closed position said link is slid along and finally brought into the space adjacent the shank 10.

In the structure that is shown in Fig. 5 the eye structure 13 is omitted and in lieu thereof there is provided a second moving part 11$^b$, the fixed part 10 being generally of U-shape and the shank 17$^b$ being of extra length.

In the structure shown in Fig. 6 the separable hook feature is of duplex form, with the fixed part 10$^c$ of S-shape, and with the moving parts 11$^c$ on opposite sides thereof.

I claim as my invention:—

1. A clip for use with anti-skidding devices comprising a fixed part having an elongated shank and a laterally directed arm at one end thereof, a moving part of shell-like form, made of sheet metal, pivotally connected to said arm, having a free end portion for bridging the gap that is formed by said shank and arm, said moving part having a portion that is adapted to lay along the side face of said arm and the adjacent portion of said shank, and a flange structure supported by said last named portion that is adapted to overlay the opposed and adjacent inner edge of said fixed part, at and adjacent the junction of said arm and shank.

2. A clip comprising a hook structure formed by a shank and a laterally directed arm, a closure for bridging the hook opening in the form of a shell-like structure that is pivoted to said arm, said closure having plate-like extensions at the sides that extend from the pivotal connection along the arm and the portion of the shank adjacent the said arm, and said extensions having on their inner edges flanges that lay over the inner edge portion of the said end portion of the shank so as to serve as a lining therefor.

3. A clip having a shank of elongated form and a laterally directed arm at both of the ends of said shank, and a shell-like moving part pivotally connected to each of said arms, said moving parts serving to bridge the gaps formed by said shank and arms.

ALBERT R. THOMSON.